Patented Nov. 30, 1926.

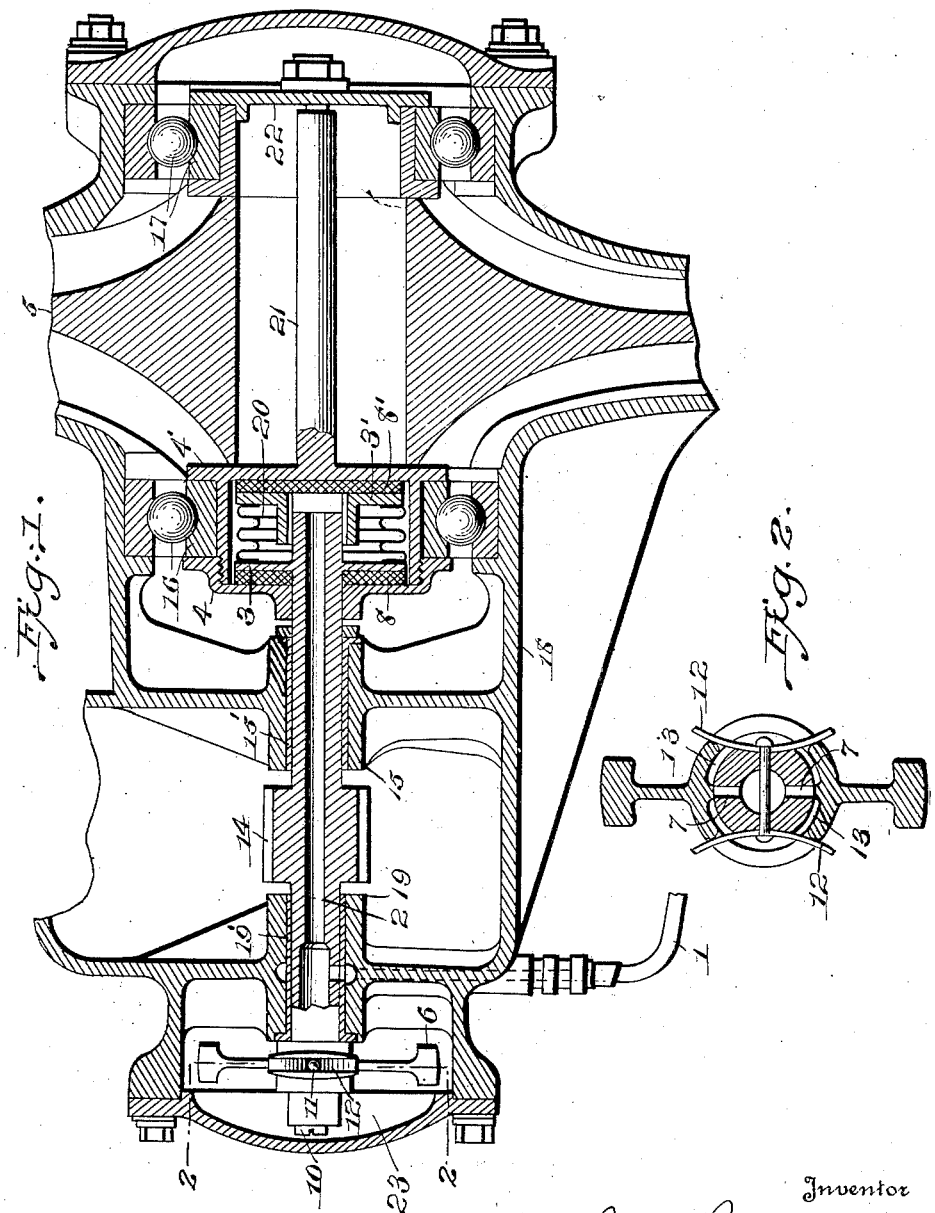

1,608,778

UNITED STATES PATENT OFFICE.

DAVID DUNWOODIE, OF DAYTON, OHIO.

CONTROL MECHANISM FOR GEAR-DRIVEN SUPERCHARGERS.

Application filed August 7, 1923. Serial No. 656,281.

This invention relates to power transmission systems and its object is to provide a device of this character which will allow a driven member to run free from sudden shocks caused by quick acceleration or deceleration in the speed of the driving member. A second object is to provide a fluid pressure controlling mechanism automatically governing the fluid pressure in accordance with the speed. A further object is to provide a fluid pressure responsive clutch member adapted to automatically connect or disconnect the driving and driven members of the clutch in accordance with the acceleration or deceleration of the speed of the driving member. A further object is to provide a gear driven supercharger of the type used for the supercharging of engines for high altitude operation in aircraft, with an automatically operated fluid pressure system of this type. A further object is to provide means for automatically applying the power in a gradual manner and without shock after the rotating parts assume a steady rotation.

With the foregoing and other objects in view, the invention consists of the combination of parts and in the details of construction more fully set forth in the attached specification and claims, the specific embodiment thereof being illustrated in the accompanying drawings, in which:

Figure 1 is a vertical longitudinal section through an impeller blade of a supercharger and shows the application of the control mechanism assembly thereto.

Figure 2 is a view in section, of the pressure regulating valve or governor, taken along line 2—2 of Figure 1.

Referring more in detail to the drawings, 1 represents a pipe which is adapted to convey, to the hollow shaft 2, some suitable fluid such as oil under a pressure regulated by the speed of the engine. The hollow shaft 2 is rotatably mounted in the casing 18 in the bearings 15 and 19 provided with bushings 15' and 19' respectively. Intermediate of the two bearings and integral with the shaft 2 is arranged a gear 14 adapted to be driven by the engine.

A supercharger impeller blade 5 is provided with a rotatable shaft 21 having a collar 22 with a ball and race bearing assembly 17. Integral with the other end of shaft 21 is a cup-shaped extension 4'. A ball and race assembly 16 is arranged between the member 4' and the casing 18 to allow rotation of the member 4'. A collar 4 is mounted on the shaft 2 and has screw threaded engagement with the member 4'. Intermediate of the members 4 and 4' is a rigid disk or flange 3 integral with shaft 2. A collar 3' is attached by means of a spline to the end of the shaft 2, so that it may move endwise along this shaft but be prevented from rotational movements thereon. A flexible bellows 20 preferably of metallic corrugated type of a circular cross section surrounds the end of the shaft 2 and is arranged between and fixed to the members 3, 3' by means of fluid tight joints. Plates 8, 8' are arranged between the members 3 and 4 and 3' and 4' respectively, plate 8 being rigidly connected to the member 3 and plate 8' being rigidly connected to the plate 3' so that a fluid pressure operated metal bellows is provided at the end of the shaft 2, forming a clutch assembly by means of which the shaft 2 is interconnected to the impeller.

The opposite end of the hollow shaft 2 is closed by means of the screw plug 10. The shaft 2 is further provided with an inertia member 6 consisting of outer weighted portions revolvably mounted upon the shaft 2 so as to provide communicating passages 7 and 13 to allow the fluid pressure to travel from the hollow shaft into the end portion 23 of the casing 18, when the passage 7 is open. Referring more in detail to Fig. 2, the weighted inertia member 6 is maintained in its normal position upon the shaft 2 by means of a plurality of leaf springs 12. When in this position the fluid under pressure within the center of the shaft 2 has no means of exit through the passage 7, as the end of this passage is closed by the snugly fitting inside portions of the inertia member. The fluid under pressure within the shaft 2 therefore, forces the plate faces 8 and 8' into an engagement with the members 4 and 4' of the driven member.

Upon a sudden increase or decrease in the speed of the engine, the inertia of the member 6 causes a relative movement of the shaft 2 and this member 6, the inertia member lagging behind when the speed of the shaft 2 is suddenly increased, so that the force of the spring members 12 is overcome momentarily and the passage 7 is allowed to communicate with the passage 13 so that the fluid may be released into the end casing 23 from whence it may be led back to the main fluid supply.

It will be understood that the fluid under pressure is supplied through the tube 1 to the main hollow shaft 2 through a suitable opening, as shown, communicating with the center of this shaft; and thence to the pressure operated clutch. The expansion of the bellows forces the plates 8, 8' to engage the plates 4, 4' on the driven member so that the shaft 21 and the friction plates thereon are driven by the shaft 2. Upon release of pressure of the fluid in shaft 2 by the actuation of the inertia member, the bellows 20 is contracted so as to assume its original normal position and the clutch becomes inoperative and allows shaft 2 and shaft 21 to rotate independently of each other.

When there is a sudden burst of power in starting the engine, the main shaft 2 rotates slightly ahead of member 6. If the source of pressure now has had time to build up a pressure within the system leading to the pipe 1 this pressure will be released immediately to the passages 7 and 13. As soon as the engine begins to run at a steady uniform speed the weights 6 resume their normal central position on the shaft and close the openings 7. The pressure then starts building up in the shaft, when the clutch expands and forces the members 8 and 8' against the members 4, 4' forming an automatically operated clutch to drive the supercharger impeller 5.

Should the throttle of the engine be thrown fully open, the high peak of power is instantaneous but not quick enough to simultaneously reach and drive the impeller 5, because of the fact that the weights 6, being equally sensitive, are meanwhile opening the pressure release passages 7. This action, as will be clearly seen, allows flow of the fluid in the end casing 23, lessens the pressure in the bellows 20, causes a disengagement of the shafts 2 and 21 by release of the clutch therebetween, and allows the impeller to run free. Consequently it is impossible in the present device to transmit sudden shocks to the supercharger impeller through a sudden change in the speed of the engine.

A sudden deceleration of the engine affects the clutch assembly in the same manner as the sudden acceleration described, the only difference of effect on the control mechanism, as a whole, being that in the case of deceleration the inertia weights 6 fly in the opposite direction to that in the case of acceleration. The remainder of the action is similar in every respect.

I claim:

1. In a power transmission, in combination, a driving member and a driven member in alignment therewith, a fluid pressure responsive clutch adapted to operatively connect said members, comprising a disk rigidly attached directly to one of said members, a flexible metal bellows attached to the periphery of said disk, a second disk splined directly to said one member and attached to said bellows, a passage for fluid pressure from said bellows to said one member, and a flat plate on each side of said bellows and attached to the other of said members and adapted to be engaged directly by the faces of said disks.

2. In a device of the character described, a driving shaft adapted to be driven by a power plant, a driven member, a source of fluid pressure incident to the operation of said power plant, a fluid pressure operated clutch operatively connecting said driving shaft to said driven member and control means adapted to control the operation of said clutch against sudden changes in the speed of said driving shaft including a valve for the fluid operated clutch, and a speed control inertia member mounted on said driving shaft for controlling said valve.

3. In a device of the character described, a driving shaft adapted to be driven by a power plant, a driven member, a source of fluid pressure incident to the operation of said power plant, a fluid pressure operated clutch operatively connecting said driving shaft to said driven member, and control means therefor including resiliently seated valves and speed controlled inertia members for seating and unseating said valves.

4. In a device of the character described, in combination, a hollow driving shaft adapted to be driven by a power plant, a driven member, a source of fluid pressure adapted to communicate with the interior of said driving shaft, a pressure responsive clutch member mounted on said shaft and adapted to operatively connect said shaft to said driven member, and an inertia operated control means mounted on said shaft and adapted to control the fluid pressure at the interior of the driving shaft.

5. In a device of the character described, in combination, a hollow driving shaft adapted to be driven by a power plant, a driven member, a source of fluid pressure adapted to communicate with the interior of said driving shaft, a pressure responsive clutch member mounted on said shaft and adapted to operatively connect said shaft to said driven member, control means mounted on said shaft and adapted to communicate with the interior thereof, said control means embodying pressure varying means operated by changes in the speed of rotation of said driving shaft.

6. In a power transmission system, in combination, a driving member, a driven member, a pressure responsive clutch adapted to operatively connect said driving member to said driven member, and automatic control means for said clutch including valve means and inertia operated control means mounted on one of said members for controlling the valve means.

7. In a control mechanism of the character described, a drive shaft operable at variable speeds, a driven member operated thereby coaxially arranged with respect thereto, and means providing an automatically detachable driving connection between said drive shaft and said driven member comprising an expansible pressure fluid clutch, having the expansible member thereof enclosing the end of said driving shaft for communicating with a bore, extending longitudinally of said shaft through which pressure fluid is introduced to said clutch, a driving plate rigid on said shaft and connected with one end of said expansible member, a second driving plate capable of movement longitudinally relative to said shaft and adapted to engage said driven member and connected on the other end of said expansible member.

8. In a control mechanism of the character described, a drive shaft operable at variable speeds, a driven member operated thereby, coaxially arranged with respect thereto, and means providing an automatically detachable driving connection between said drive shaft and said driven member, comprising an expansible pressure fluid clutch having the expansible member thereof enclosing the end of said driving shaft for communicating with a bore, extending longitudinally of said shaft through which pressure fluid is introduced to said clutch, a driving plate rigid on said shaft and connected with one end of said expansible member, a second driving plate capable of movement longitudinally relative to said shaft and adapted to engage and frictionally drive said driven member and connected on the other end of said expansible member, and means on the other end of said shaft for bypassing pressure fluid from said source to vary the pressure with which said clutch frictionally drives said driven member.

9. In a supercharger the combination of a casing, a driving shaft mounted in bearings in said casing having a driver gear intermediate the ends thereof, an impeller plate driven by said shaft and coaxially arranged with respect thereto at one end, means for introducing pressure fluid to a bore extending longitudinally of said shaft, and means between one end of said shaft and the impeller for providing a detachable driving connection therebetween, comprising an expansible fluid pressure metal bellows enclosing the open end of said shaft, a driving plate rigid on said shaft and affixed to one end of said bellows, a second driving plate affixed to the other end of said bellows and adapted to engage and frictionally drive said impeller, and means for controlling the pressure of the fluid to vary the pressure with which said second driving plate frictionally drives said impeller.

10. In a supercharger the combination of a casing, a driving shaft mounted in bearings in said casing having a driver gear intermediate the ends thereof, an impeller plate driven by said shaft and coaxially arranged with respect thereto at one end, means for introducing pressure fluid to a bore extending longitudinally of said shaft, and means between one end of said shaft and the impeller for providing a detachable driving connection therebetween, comprising an expansible fluid pressure metal bellows enclosing the open end of said shaft, a driving plate rigid on said shaft and affixed to one end of said bellows, a second driving plate splined to said shaft affixed to the other end of said bellows and adapted to engage and frictionally drive said impeller, and means for controlling the pressure of the fluid to vary the pressure with which said second driving plate frictionally drives said impeller, comprising a relief port provided in the opposite end of said shaft for bypassing pressure fluid from said shaft, and means in the nature of inertia weights given angular deflection from a normal position coaxial with said shaft in the sudden acceleration or deceleration thereof for controlling said port.

In testimony whereof I affix my signature.

DAVID DUNWOODIE.